June 11, 1957 N. E. WICKLAND 2,795,334
STRAINER DEVICE
Filed June 16, 1954 2 Sheets-Sheet 1

INVENTOR.
NELS ERIC WICKLAND
BY
Jay & Jay
ATTY'S.

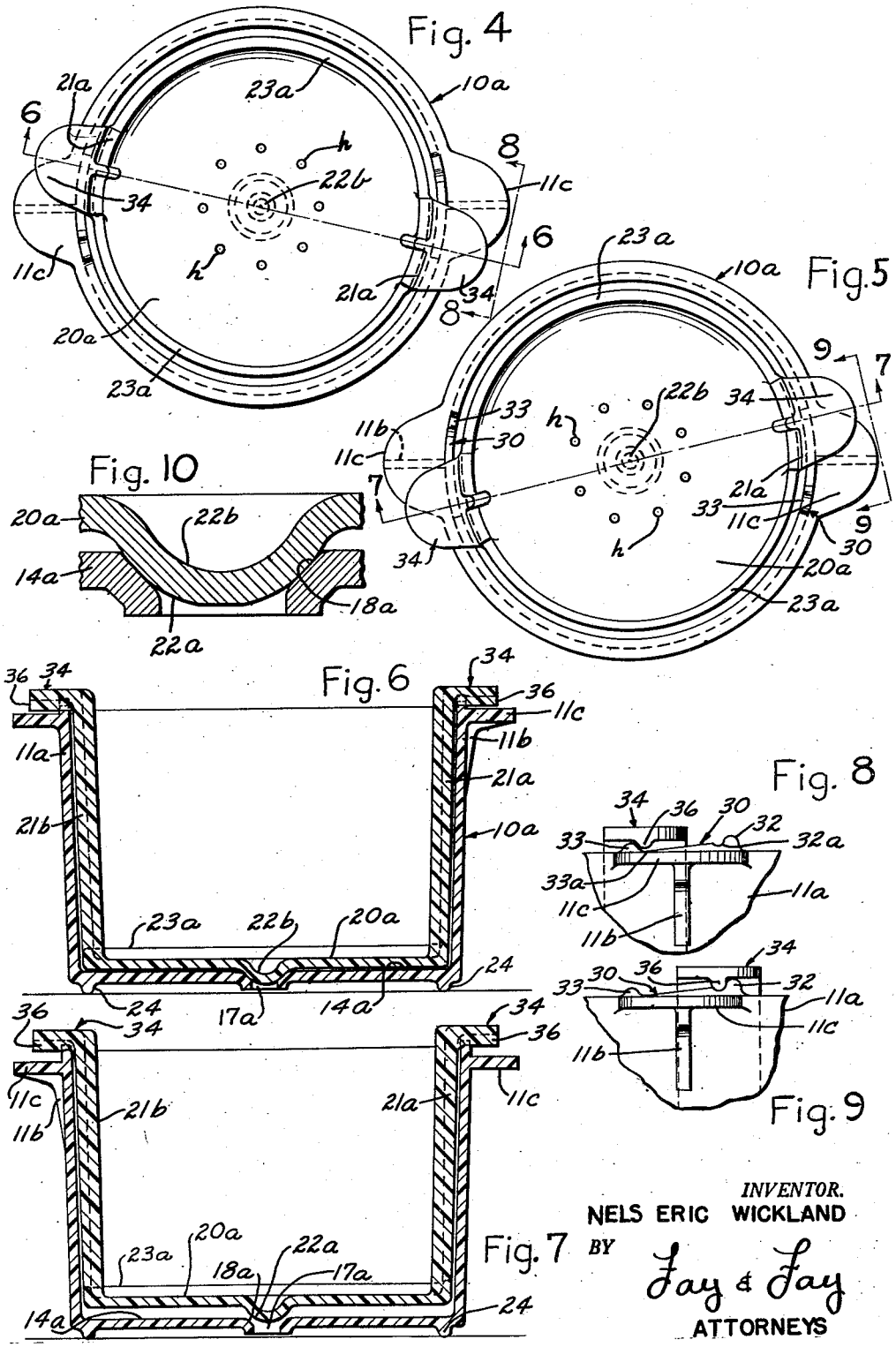

United States Patent Office 2,795,334
Patented June 11, 1957

2,795,334

STRAINER DEVICE

Nels Eric Wickland, Cleveland Heights, Ohio

Application June 16, 1954, Serial No. 437,054

1 Claim. (Cl. 210—419)

This invention relates to a separating device generally and more particularly to apparatus for separating liquid of different specific gravity, as for example, a container adapted to separate grease from broth stock and to retain the one while dispersing the other.

An object of the invention is to provide a simple, inexpensive container to permit the separation of grease from broth in a more economical, practical way than has heretofore been possible.

Another object of the invention is to provide separator means in a container vessel to retain grease in the container while the broth is released from the container.

A further object is to provide a separator device which may be readily detached to facilitate cleaning after use.

Other objects and advantages of the invention will be apparent from the following description of the invention, reference being made to the accompanying drawings wherein:

Figs. 4 and 5 are plan views of an alternate form of the invention with the disk arms being shown in closed and spaced position relative to the drain aperture;

Figures 1, 2, 3:
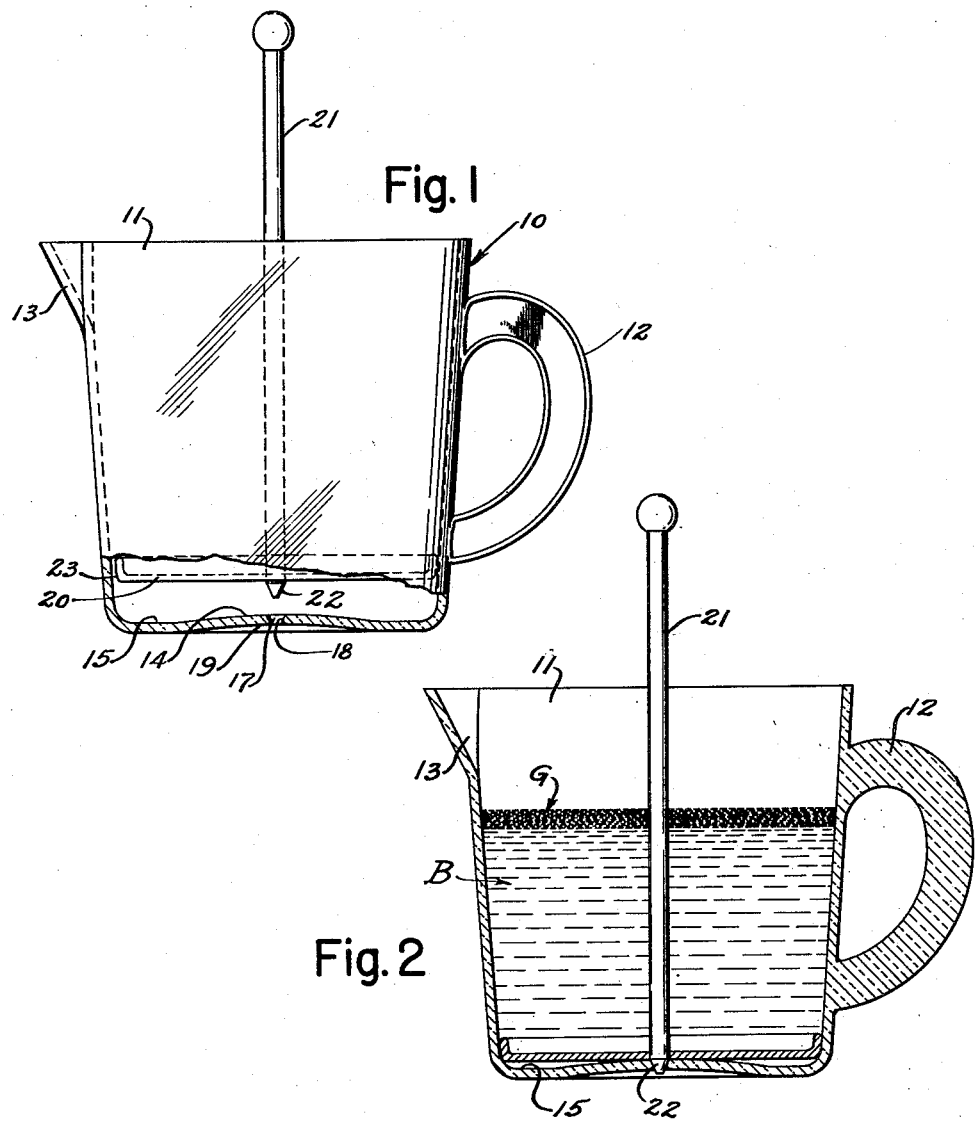
Fig. 1 is a side elevation of one embodiment of the invention, the bottom portion of the aparatus being shown in section.
Fig. 2 is a side view in section through the container.
Fig. 3 is a fragmentary view in section of the lower part of the container showing the stopper member spaced above the drain aperture.

Figs. 6 and 7 are side views in section taken on the lines 6—6 and 7—7 of Figs. 4 and 5 respectively;

Figs. 8 and 9 are fragmentary side elevations taken on the lines 8—8 and 9—9 of Figs. 4 and 5 respectively; and Fig. 10 is an enlarged section of the stopper end in its drain aperture seat.

Referring now to the drawings, in Fig. 1 is illustrated a container, here shown in the form of a pitcher 10, having a body portion 11 and a handle 12. Preferably the container member will be transparent and may be of plastic or other suitable material. The container may have a spout 13.

The inside bottom of the container form shown in Figs. 1, 2 and 3 has a raised central surface 14 and a lower annular portion indicated by the numeral 15 surrounding the central portion. The drain aperture 17 has, in this form, a tapered surface 18, the purpose of which will be explained hereinbelow. The outer surface of the bottom of the container beneath the portion 14 is indicated by the numeral 19. It will be noted that the walls of the container are slightly tapered.

Adapted to act in co-operation with the container is a strainer device which, in this form, has a disk 20 having secured to it a centrally disposed vertical handle portion 21. Projecting below the lower surface of the disk 20 is a tapered stopper or tip portion 22 adapted to seat in the drain aperture 17 against the tapered walls 18 of the container bottom. The upper peripheral surface of the disk 20 is preferably formed into a ridge or annular bead 23 to provide an extra vertical section at the circumference of the disk.

As a typical example of the operation of my device, a liquid such as hot grease and broth stock is poured into the container, as may be seen in Fig. 2, with the stopper member 22 being in sealing position with the aperture 17. Normally, the grease in the liquid will promptly collect in the upper part of the liquid in a layer, such as is indicated in Figs. 2 and 3 by the letter G, with the broth or clear stock B remaining beneath the grease.

In order to release the clear stock or broth from the container, it is only necessary to lift or tip the disk by means of the handle member, thus separating the stopper 22 from the drain aperture 17. With the disk being separated or spaced from the bottom of the container, the broth B will escape around the edges of the disk, shown particularly in Fig. 3, and out through the aperture 17 into a suitable receptacle. Since the space between the ridge portion 23 of the disk and the wall of the container is very slight, pieces of solid matter will tend to collect within the disk on the upper surface thereof.

As broth is released from the container and the grease line approaches the disk near the bottom of the cup, the disk may be slowly lowered so that the circumferential ridge 23 fits closely against the walls 11 of the container so that the grease will be prevented from slipping around this circumferential ridge 23. The raised edge portion 23 of the disk also tends to collect the last remaining grease on the top of the disk and act as a retainer wall to impede any tendency of the grease to flow over the ridge portion.

Another feature of interest in this form of the invention is that should any grease escape around the edges of the disk, it will tend to stay in the outer portion of the cup above the bottom portion 15 since the center portion 14 is elevated above the portion 15. Since the cup or container is transparent, one using my apparatus can easily detect when the stock is run off and hence seal the container by dropping the stopper member into the aperture 17 to prevent any grease from escaping. Another feature of advantage in the design of my device is that the diameter of the disk member is so proportioned that it substantially coincides with the inner diameter of the cup at the curved bottom portion thereof to form an effective sealing contact of the disk against the edges of the cup at the bottom. It will also be apparent, since the stopper member is positioned centrally of the disk, that the co-operative action of the periphery of the disk against the walls of the cup tends to align the stopper 22 with the aperture 17 to permit quick seating therein.

An additional feature that should be pointed out is that the depth of the stopper or tip portion of the handle member protruding below the lower surface of the disk is proportioned to the depth of the cup bottom measured from the highest point of the surface 14 to the surface 19, so that when the cup is placed on a horizontal surface with the stopper tip seated in the aperture, the stopper will not protrude below the outer bottom of the cup in such a way as to tilt the cup or allow leakage.

An alternate form of the invention is shown in Figs. 4 through 10 and where applicable corresponding reference numbers are used with letter suffixes. In this modification a container 10a has lateral walls 11a. The container is provided with handle portions 11c which may be supported by a rib 11b. Projecting below the base of the container is an annular bead 24. In this form the inside surface 14a of the bottom of the container may be substantially flat with the drain aperture 17a being centrally disposed therein. A preferred conformation of the wall 18a of the drain aperture 17a is shown in Fig. 10.

Adapted to co-operate with the container is a strainer device comprising a disk 20a and upwardly extending handle portions 21a and 21b. At the top of these handle portions I have provided outwardly extending tabs 34, the structural details of which may be best seen in Figs. 8 and 9.

In the bottom of the disk I have provided a plurality of small apertures h, which may be spaced around the center of the disk. In this form of the invention the stopper element 22b is formed by embossing the wall of the disk in the form shown particularly in Fig. 10. The embossment or nodule 22b has a spherical outer surface 22a particularly well adapted to seat effectively against the tapered surface 18a of the bottom of the container.

Along the top surface of the wall 11a and inward of the handle portions 11c, I have provided a cam-like surface 30 having a lower position limit ridge 33 and an upper position limit ridge 32. A horizontally extending rib 36 of the handle element 34 is adapted to act as a cam follower in connection with the cam surface. In Fig. 8 I have shown how the cam follower 36 rests against the ridge 33 when the stopper element 22b is in the seating position, as shown in Fig. 6. It will be noted that the surface of the rib 36 is somewhat spaced from the surface 32a of the cam 30 to insure positive seating of the stopper.

When it is desirable to separate and drain the broth from the container as discussed hereinabove, the tabs 34 are moved into the position shown in Fig. 9 with the cam follower 36 sliding along the cam to rest in the notch 32a against the ridge 32. This movement of the tabs and of the handle portion lifts and spaces the disk 20a and its embossment 22b from the drain aperture and allows broth stock to drain around the edges of the ridge 23a of the disk and through the apertures h in the disk bottom.

It will be apparent in this form of the invention that I have provided a simple and practical means whereby, through a small movement of the tabs 34 of the handle portions 21a and 21b, the strainer device and disk may be lifted and spaced from the drain aperture, thus allowing broth stock or the like to escape from the container. The handle portions 21a and 21b conform to the walls of the container and, as they rest against the cam surface of the top of the container, give lateral stability to the entire strainer device. A feature of advantage in this form of the invention is that the handle portions are at the sides of the container rather than at the center, thus allowing liquids to be poured directly into the container without contacting the handle as sometimes might occur with the use of a centrally disposed handle as shown in Figs. 1–3.

The operation of the alternate form of the invention is exceedingly simple in that the user may hold the container by the handles 11c and manipulate the tabs 34 of the strainer device by a thumb or index finger from the position shown in Fig. 4 to that shown in Fig. 5.

In this alternate form of the invention, as was the case with that shown in Figs. 1–3, the construction of the drain aperture and the relationship of the stopper member thereto, is such that the stopper will not protrude through the aperture in a way that might allow the inadvertent displacement of the stopper by contact with the surface supporting the container. In the alternate form the disk could have more than one embossment and the container complementary drain apertures, should this be desired.

It will be apparent to those skilled in the art to which this invention relates that modifications could be made to the form of the cam and cam follower shown in that additional notches could be placed on the cam surface intermediate those shown should other types of screening or separating operations be desired.

Although I have described two forms of the invention, it will be apparent that other forms of the invention might be adopted, all falling within the scope of the claim which follows.

I claim:

In combination, a hollow, integrally formed container being of inverted frusto-conical conformation and with the lateral surfaces of the container terminating in a bottom wall, said bottom wall having a centrally located aperture formed therein, a portion of the lateral surface of the bottom wall forming said aperture being frusto-conical in conformation; and a strainer member comprising a disk having a diameter substantially complementary with the inner diameter of the container near the bottom wall thereof, said disk having an annular bead at its periphery and having a stopper projection depending from the disk and centrally thereof and being adapted to register with the walls of the aperture of the container, the said disk having perforations therein and with the size of the perforation and the annular space between the periphery of the disk and the lateral wall of the container being so dimensioned as to retain particles of larger size from passing through or around the disk, and a handle secured to said disk and extending substantially vertically therefrom and being adapted to move the strainer into and out of registration with the aperture in the container bottom.

References Cited in the file of this patent
UNITED STATES PATENTS

| | | |
|---|---|---|
| 306,170 | Mosely | Oct. 7, 1884 |
| 616,192 | King | Dec. 20, 1898 |
| 870,110 | Lawrence | Nov. 5, 1907 |
| 1,240,360 | Palmer | Sept. 18, 1917 |
| 2,142,914 | Myers | Jan. 3, 1939 |
| 2,320,570 | Crocker | June 1, 1943 |
| 2,320,711 | Bramhal | June 1, 1943 |